US007768225B2

(12) United States Patent
Toyama et al.

(10) Patent No.: US 7,768,225 B2
(45) Date of Patent: Aug. 3, 2010

(54) SERVO CONTROL SYSTEM FOR MOVABLE BODY, AND LASER DRILLING MACHINE

(75) Inventors: Souichi Toyama, Ebina (JP); Yaichi Okubo, Ebina (JP); Hiromu Hirai, Nagoya (JP); Makoto Iwasaki, Nagoya (JP); Motohiro Kawafuku, Nagoya (JP); Noriaki Hirose, Nagoya (JP)

(73) Assignee: Hitachi Via Mechanics Ltd., Ebina-shi (JP)

( * ) Notice: Subject to any disclaimer, the term of this patent is extended or adjusted under 35 U.S.C. 154(b) by 766 days.

(21) Appl. No.: 11/049,706

(22) Filed: Feb. 4, 2005

(65) Prior Publication Data

US 2005/0187650 A1 Aug. 25, 2005

(30) Foreign Application Priority Data

Feb. 6, 2004 (JP) ............................ 2004-030736

(51) Int. Cl.
*G06F 19/00* (2006.01)
*B23K 26/04* (2006.01)

(52) U.S. Cl. ...................... 318/611; 318/615; 318/632; 219/121.7; 219/121.83; 359/198.1; 700/69; 700/70; 700/166

(58) Field of Classification Search ............................... 219/121.63–121.75, 121.82, 121.83; 318/560, 318/611, 615, 632; 700/159, 160, 166, 186, 700/193, 169, 170; 359/198.1
See application file for complete search history.

(56) References Cited

U.S. PATENT DOCUMENTS 4,339,700 A * 7/1982 Desbiens et al. ............ 318/660
4,638,143 A * 1/1987 Akeel .................... 219/121.74
4,639,587 A * 1/1987 Chadwick et al. ........ 250/201.3
4,639,884 A * 1/1987 Sagues ....................... 702/147
4,817,007 A * 3/1989 New ........................... 700/159
5,325,247 A * 6/1994 Ehrlich et al. ............ 360/78.09

(Continued)

FOREIGN PATENT DOCUMENTS

JP 08-137551 5/1996

(Continued)

OTHER PUBLICATIONS

Katayama, Toru, "Fundamentals of Feedback Control" (in Japanese), Chapter 6 to Chapter 7, Asakura-shoten, Ltd., Tokyo, May 20, 1987.

(Continued)

*Primary Examiner*—Samuel M Heinrich
(74) *Attorney, Agent, or Firm*—Crowell & Moring, LLP

(57) ABSTRACT

A difference between each position command data outputted in a form of a step signal from a high-level controller and its corresponding detected position data of a movable body is integrated by an integral compensator to position the movable body. Assuming, for example, that the movable body is a steerable mirror, digital filters are arranged to compensate the value of an initial state of an angular displacement and the value of an initial state of an angular velocity, respectively, and respective impulse responses of the digital filters as additional input elements are added to an output terminal of the integral compensator. For higher effectiveness, internal state variables of the digital filters can desirably be cleared to zero whenever an angle (position) command data is received.

3 Claims, 6 Drawing Sheets

10b DIGITAL FITER
10a DIGITAL FITER
ANGLE COMMAND DATA 8
2 INTEGRAL COMPENSATOR
AUGMENTED CONTROLLED SYSTEM S
5 TORSIONAL-VIBRATION STABILIZING COMPENSATOR
6 D/A CONVERTER
7 CURRENT CONTROL CIRCUIT
1 ROTARY ACTUATOR
CONTROLLED VARIABLE SIGNAL 11
3 PROPORTIONAL COMPENSATOR
4 VELOCITY OBSERVER
DETECTED ANGLE DATA 9

U.S. PATENT DOCUMENTS 5,450,202 A * 9/1995 Tisue ......................... 356/614
5,623,402 A * 4/1997 Johnson ....................... 700/42
5,872,363 A * 2/1999 Bingham et al. ....... 250/363.01
6,018,685 A * 1/2000 Fujita et al. .................. 700/61

FOREIGN PATENT DOCUMENTS

JP 2000-028955 1/2000
JP 2002-040357 2/2002
JP 2002-040358 2/2002
JP 2003-057570 2/2003

OTHER PUBLICATIONS

Yamaguchi, Takashi, et al., "Design of Initial Value Compensation with Additional Input for Mode Switching Control and Its Application to Magnetic Disk Drives" (in Japanese/English Abstract), SICE Transactions, 32(8), pp. 1219-1225, 1996.

* cited by examiner

SERVO CONTROL SYSTEM FOR MOVABLE BODY, AND LASER DRILLING MACHINE

FIELD OF THE INVENTION

This invention relates to a servo control system for a movable body, which detects the position of the movable body and controls the movable body such that the movable body traces designated target values, and also to a laser drilling machine which controls a moving unit by such a servo control system for a movable body.

DESCRIPTION OF THE BACKGROUND

For a laser drilling machine which performs drilling, for example, in a fabrication process of a printed circuit board, a positioning control system is required to sequentially irradiate a laser beam to plural positions of a work under drilling. A steerable mirror control system is often used to materialize a high drilling throughput and high-accuracy drilling.

In general, a laser drilling machine is a numerical control (NC) machine having a hierarchical control structure, and a steerable mirror control system is included in its lowest level hierarchy. In a control system of high level hierarchy (hereinafter called "the high-level control unit"), the order of drilling is optimized based on CAM (Computer Aided Manufacturing) data for a printed circuit board such that a high drilling throughput can be materialized, and perforation position coordinates are written in an NC program in an order of the drilling.

Such an NC program has been prepared beforehand and, when drilling begins, the high-level control unit subjects perforation position coordinates in the program successively to a coordinate transformation and transmits time-series angle command data to the steerable mirror control system. For the drilling of each perforation in the form of a true circle, there is a need to irradiate a laser beam after a steerable mirror has been brought into a standstill at an angle designated by an angle command data. The transmission of the angle command data and control of the irradiation of the laser beam are, therefore, performed in unison within the high-level control unit.

Principal elements of the steerable mirror control system include a steerable mirror as a movable body, a rotary actuator for changing the position or angle of the steerable mirror over a range of approx. ±15° max., and a control circuit for feedback controlling the angle of the steerable mirror.

As the rotary actuator, an electromagnetic actuator is used in common. This electromagnetic actuator generates a drive torque according to an electromagnetic principle. The steerable mirror is fixedly secured on a drive shaft of the rotary actuator so that the drive shaft serves as a support for the steerable mirror. On this drive shaft, a sensor and a moving coil or moving magnet are also arranged in addition to the steerable mirror.

The angle of a rotation of the steerable mirror is detected by the sensor, and the detected angle data is fed to a feedback control circuit. The feedback control circuit is realized by an analog control unit constructed of an operational amplifier or a digital control firmware constructed in combination of a microprocessor and a program. A single positioning operation of the steerable mirror may vary from the order of 0.01° to approx. 30° in terms of angular stroke, and the positioning time may range from less than 1 millisecond to several milliseconds (ms).

The steerable mirror control system receives a single angle command data as a step input signal to perform a single positioning operation. Namely, the steerable mirror control system rotates the steerable mirror on the basis of the thus-received single angle command data. As soon as the steerable mirror begins a rotary motion, an integral compensation functions to bring the resulting mirror angle into conformity with the angle command data without error. In this compensation, a value obtained by subtracting each detected angle data from the angle command data, that is, a tracking error signal is integrated. For the assurance of a stable operation of the feedback loop in the steerable mirror control system, there is also a need to set a phase margin and gain margin of a loop transfer function at sufficiently large values. Differentiation of detected angle data or use of a so-called state observer makes it possible to apply a stabilizing compensation and a phase lead compensation, both of which rely upon angular velocity signals. These control methods are known well as fundamentals of feedback control theories [see KATAYAMA, Toru, "Fundamentals of Feedback Control" (in Japanese), Chapter 6 to Chapter 7, Asakura-shoten, Ltd., Tokyo (May 20, 1987)].

With a view to shortening the time required to position a steerable mirror, a technique is also employed to make a feedback loop operable at a wide band of frequencies. Described specifically, in the case of the above-mentioned electromagnetic actuator, the steerable mirror, sensor and the like arranged on the drive shaft act as inertial loads, and therefore, shaft torsional vibrations may occur in a high-speed operation. As plural torsional vibration modes generally exist in a range of several kHz or more, the feedback loop is made applicable over a broad frequency range by a vibration-mode stabilizing compensator. This stabilization compensator serves to estimate the state values of the torsional vibration modes and to feedback the estimated values (see, JP-A-2002-40357 and JP-A-2002-40358).

Another technique is also known (see JP-A-2003-57570). According to this technique, a strain sensor is arranged to detect torsional vibrations of a drive shaft, and signals from the strain sensor are used to reduce torsional vibrations.

A feedback loop is constructed by combining these methods with the above-mentioned integral compensation and phase lead compensation. Characteristics of the feedback loop are adjusted such that the time required for each single positioning operation (positioning time) meets a specified target and an overshoot and residual torsional vibrations, both of which are contained in a transient response (settling response) in the neighborhood of a target angle, fall within their corresponding permissible ranges.

A Fourier analysis of a series of angle command data transmitted in time sequence from the high-level control unit (hereinafter called "angle command pattern") makes it possible to understand that each angle command pattern has its own different frequency spectrum. If any certain spectrum component coincides with a resonance frequency of the above-mentioned torsional vibrations in this case, its vibration mode is considered to result in the production of residual vibrations so that the positional accuracy of drilling would be deteriorated.

With a view to overcoming the above-mentioned problem, a further technique has been proposed (see JP-A-2000-28955). With respect to three successive angle command data, an operating frequency for a steerable mirror is calculated based on their positioning times. If this operating frequency is determined to be a condition that tends to induce residual vibrations, the third positioning time is extended to operate the steerable mirror such that a resonance frequency range can be avoided, thereby realizing to perform successive positioning operations at higher speed and higher accuracy.

In addition, a hard disk drive can be mentioned as an apparatus making use of a high-speed and high-accuracy, positioning control technique. To record and read digital information on the surface of a magnetic disk, the hard disk drive is equipped with a feedback control means for driving the magnetic head at high speed and positioning it with high accuracy. The control means has a controller specialized for high-speed drive and another controller specialized for high-accuracy positioning, and makes use of mode switching control that alternately switches a high-speed drive mode and a high-accuracy positioning mode. The switching of the control modes is performed during the drive of the magnetic head so that, in the controller for the mode to which the control mode has been switched, a state variable at the moment of the switching, in other words, a response derived from the initial state value significantly affects a transient response of the positioning operation. A compensation signal corresponding to the initial state value is, therefore, inputted on or after the time of the mode switching to improve the transient response [see JP-A-8-137551, and YAMAGUCHI, Takashi and HIRAI, Hiromu, "Design of Initial Value Compensation with Additional Input for Mode Switching Control System and Its Application to Magnetic Disk Drives" (in Japanese), SICE Transactions, 32(8), 1219-1225 (1996)].

To make an improvement in the throughput of a laser drilling machine, there is a tendency to shorten the time interval of step signals in an angle command pattern (hereinafter called "command interval"). A shorter command interval, however, leads to the inclusion of more high-frequency components in the frequency spectrum of an angle command pattern, so that due to high-order vibration modes of a drive shaft, residual vibrations tend to occur, resulting in a concern about potential deterioration in the positioning accuracy. Nonetheless, the above-described conventional techniques indicate no means for the realization of high-speed and high-accuracy positioning without extending the positioning time for various angle command patterns.

To make the command interval extremely short, it is necessary to perform irradiation of a laser beam and to begin the next positioning operation before the steerable mirror comes to a complete standstill subsequent to an entrance into a permissible range of settling response amplitude. If any settling response of the preceding positioning is still remaining at this stage, the state values in the dynamic characteristic modes contained in the feedback loop (hereinafter called"initial state value") are not zero (0) at the time point of the start of the next operation.

An angle command pattern is generally irregular, and therefore, can take any one of various initial state values. Especially in a positioning operation over a small angle stroke, the positioning time is short so that the steerable mirror is brought close to a target angle before the influence of the initial state values attenuates sufficiently. As a consequence, the subsequent settling responses have different waveforms, respectively. When a demand arises for drilling of still higher accuracy in the future and the permissible range of settling response amplitude becomes narrower accordingly, a technique will be required to control the settling response amplitude small for any angle command pattern.

The conventional techniques, however, shows no means for stably controlling small the settling responses for positioning, which begin from initial state values that can vary widely.

In feedback control of a hard disk drive, a controlled variable is a positioning error of the magnetic head to the center of a target data track, so that subsequent to the switching of the control modes to a high-accuracy positioning mode, the target value is always zero (0), i.e., a constant value. A steerable mirror control system, on the other hand, is different in that an angle command pattern as a target value successively varies like step signals. They are also different from each other in that the former includes the switching of the control mode. The above-described conventional technique which is directed to hard disk drives indicates no means for stably controlling settling responses small in such control as tracking a target value, which successively varies like step signals, by a single control mode.

SUMMARY OF THE INVENTION

An object of the present invention is, therefore, to solve the above-described problems of the conventional techniques and to provide a servo control system for a movable body and a laser drilling apparatus, both of which feature short positioning time and excellent positioning accuracy.

To achieve the above-described object, the present invention provides in a first aspect thereof a servo control system for a movable body. The servo control system is provided with a feedback loop such that the movable body is positioned based on position command data. The servo control system comprises an additional input means for inputting at least one additional input signal, which is other than said position command data, to said feedback loop. Preferably, the additional input means can input two additional input signals.

The present invention also provides in a second aspect thereof a laser drilling machine, which comprises the above-described servo control system and a control means for controlling an angle of a steerable mirror as the movable body such that an angle of a laser beam reflected by the steerable mirror is controlled by the control means to perform drilling at a predetermined position of a work.

According to the present invention, the movable member can be positioned at high speed with high accuracy. Therefore, the present invention can improve, for example, the throughput and accuracy of machining.

DETAILED DESCRIPTION OF THE INVENTION AND PREFERRED EMBODIMENTS

The present inventors have found that a vibrational settling response, which takes place in conventional steerable mirror control systems, can be attributed to an influence from the initial state values in the first-order torsional vibration mode.

A description will hereinafter be made about an application of the present invention to a steerable mirror control system.

Figure 1:
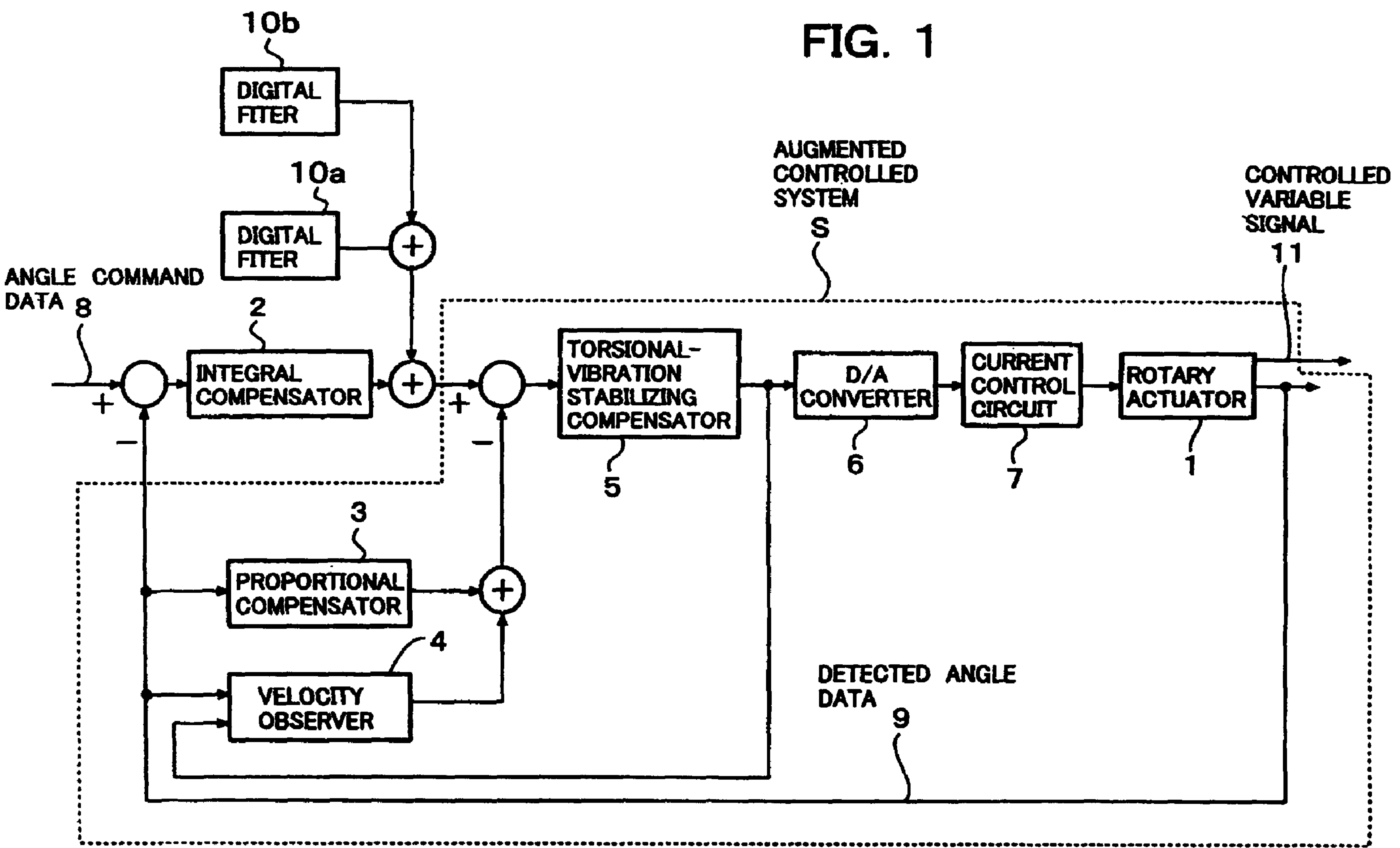
FIG. 1 is a block diagram of a steerable mirror control system according to an embodiment of the present invention.

A steerable mirror control system according to an embodiment of the present invention as illustrated in FIG. 1 is realized by a digital control firmware making use of a microprocessor (not shown), and in respect to an integral compensator 2, a proportional compensator 3, a velocity observer 4, a torsional-vibration stabilizing compensator 5, a digital filter 10*a* and a digital filter 10*b*, processing operations are written in parts of a program which the microprocessor executes. These processing operations are performed at discrete times of a predetermined sampling period (hereinafter called "discrete times").

A rotary actuator 1 is provided with a single steerable mirror (not shown). An angle of this steerable mirror is a controlled variable signal 11 in the control system. A rotary encoder, which is built in the -rotary actuator 1 and is not shown in the diagram, transmits a detected angle data 9 at every discrete time. In the steerable mirror control system, a tracking error signal obtained by subtracting the detected angle data 9 from an angle command data 8 received from a high-level control unit is inputted to the integral compensator 2, and a time integral of the tracking error is determined by an operation. To an output from the integral compensator 2, outputs from the digital filters 10*a*, 10*b* are added. These digital filters 10*a*, 10*b* are elements important to the present invention, and will be described in detail subsequently herein.

The proportional compensator 3 multiplies the detected angle data 9 with a proportional gain.

The torsional-vibration stabilizing compensator 5 stabilizes the feedback loop of the steerable mirror control system against one or more torsional vibration modes which the drive shaft of the rotary actuator 1 is equipped with.

The velocity observer 4 is inputted with an output signal from the torsional-vibration stabilizing compensator 5 and also with the detected angle data 9, and outputs an estimate signal of an angular velocity of the mirror.

A D/A converter 6 converts an output signal of the torsional-vibration stabilizing compensator 5 into an analog signal. This analog signal is a current command signal, and a current control circuit 7 feeds a drive current to the rotary actuator 1 after controlling the drive current such that it tracks the current command signal.

A description will next be made about additional inputs to perform the compensation of an initial value. These additional inputs are impulse series signals which the digital filters 10*a*, 10*b* generate at every discrete time. For the convenience of formulation, an area S surrounded by dashed lines in FIG. 1 will be called "an augmented controlled system".

The augmented controlled system S is a single input/single output system. A sum of an output from the integral compensator 2, an output from the digital filter 10*a*, and an output from the digital filter 10*b* is an input signal to the augmented controlled system S, and the detected angle data 9 is an output signal from the augmented controlled system S.

A discrete-time state equation of the augmented controlled systems can be represented by the following equations (1) and (2):

$$X_p(i+1)=A_pX_p(i)+B_pu'(i) \tag{1}$$

$$y(i)=C_px_p(i) \tag{2}$$

where

- i: index representing the passage of discrete time,
- $x_p$: state vector of an $m^{th}$-order augmented controlled system,
- u': input signal to the augmented controlled system S,
- y: output signal from the augmented controlled system S,
- $A_p$: m×m real matrix,
- $B_p$: m×1 real matrix, and
- $C_p$: 1×m real matrix.

A discrete-time state equation of the integral compensator 2 can be represented by the following equations (3) and (4):

$$X_c(i+1)=A_cX_c(i)+B_c(r(i)-y(i)) \tag{3}$$

$$u'(i)=C_cX_c(i)+D_c(r(i)-y(i)) \tag{4}$$

where

- $X_c$: state vector of an $n^{th}$-order integral compensator,
- r: angle command data,
- $A_c$: n×n real matrix,
- $B_c$: n×1 real matrix,
- $C_c$: 1×n real matrix, and
- $D_c$: 1×1 real matrix.

From the equations (1) to (4), the transfer function of the feed back loop can be derived as represented by the following equation (5):

$$Y(z)=\frac{N_r(z)}{D(z)}R(z)+\frac{N_p(z)}{D(z)}x_{p0}+\frac{N_c(z)}{D(z)}x_{c0} \tag{5}$$

where

- z: z-transform complex variable,
- R: z-transform of the angle command data r,
- Y: z-transform of the output signal y from the augmented controlled system S,
- D(z): high-order polynomial for z,
- $N_r(z)$: high-order polynomial for z,
- $N_p(z)$: 1×m high-order polynomial matrix for z,
- $N_c(z)$: 1×n high-order polynomial matrix for z,
- $X_{p0}$: initial state value $X_{p(0)}$ of the state vector $X_p(i)$ in the equation (1), and
- $X_{c0}$: initial state value $X_{c(0)}$ of the state vector $X_c(i)$ in the equation (3).

Further, the initial time i=0 to define initial state values is supposed to be a time at which a single positioning operation starts, in other words, a time at which the steerable mirror control system has received a single angle command data.

What is meant by the equation (5) is that the response Y(z) of the feedback loop is determined by the linear sum of a response to the angle command data R(z), a response to the initial state value $X_{p0}$ and a response to the initial state value $X_{c0}$.

As the second and third terms in the right side of the equation (5) are both responses to the initial state values, they will be collectively represented by $Y_0(z)$. $Y_0(z)$ can then be developed as shown by the following equation (6):

$$Y_0(z)=\frac{N_p(z)}{D(z)}x_{p0}+\frac{N_c(z)}{D(z)}x_{c0}= \tag{6}$$

-continued $$= \frac{[N_{p1}(z) \cdots N_{pq}(z) \cdots N_{pm}(z)]}{D(z)} \begin{bmatrix} x_{p01} \\ \vdots \\ x_{p0q} \\ \vdots \\ x_{p0m} \end{bmatrix} + \frac{[N_{c1}(z) \cdots N_{cn}(z)]}{D(z)} \begin{bmatrix} x_{c01} \\ \vdots \\ x_{c0n} \end{bmatrix}$$

where $N_{p1}(z)$ to $N_{pm}(z)$: elements of the high-order polynomial matrix $N_p(z)$ in the equation (5), respectively; and high-order polynomials for z, $N_{c1}(z)$ to $N_{cn}(z)$: elements of the high-order polynomial matrix $N_c(z)$ in the equation (5), respectively; and high-order polynomials for z, $X_{p01}$ to $X_{p0m}$: individual elements of the initial state vector $X_{p0}$ in the equation (5), and $X_{c01}$ to $X_{c0n}$: individual elements of the initial state vector $X_{c0}$ in the equation (5).

On the presumption that the initial value response to the $q^{th}$ initial state value $X_{p0q}$ in the first term of the right side of the equation (6) is giving an adverse effect on the response Y(z) of the feedback loop, a discussion will now be made as to the suppression of the adverse effect by additional inputs from the digital filters 10_a_, 10_b_ in FIG. 1.

The transfer function of each digital fiber will hereinafter be represented by $n_q(z)/d_q(z)$. q is a subscript, and is used with the same meaning as the subscript q in the $q^{th}$ initial state value $X_{poq}$ which appears in the first term of he right hand of the equation (6). Accordingly, q=1, 2, . . . , m. $n_q(z)$ and $d_q(z)$ are both high-order polynomials for z.

Further, the z transforms of additional inputs outputted from each digital filter will be represented by $U_{aq}(z)$.

Let's next assume that an impulse signal equivalent to the initial state value $X_{p0q}$ is inputted into the transfer function $n_q(z)/d_q(z)$ and its response is used as an additional input $U_{aq}(Z)$ represented by the following equation (7):

$$U_{aq}(z) = \frac{n_q(z)}{d_q(z)} x_{p0q} \tag{7}$$

Since the additional input $U_{aq}(Z)$ is added to the input signal to the augmented controlled system S as illustrated in FIG. 1, a term of a response to the additional input $U_{aq}(Z)$ is linearly added with the right hand of the equation (6) so that the equation (6) can be developed as shown by the following equation (8):

$$Y_0(z) = \frac{N_p(z)}{D(z)} x_{p0} + \frac{N_c(z)}{D(z)} x_{c0} + \frac{N_u(z)}{D(z)} U_{aq} = \frac{N_p(z)}{D(z)} x_{p0} + \frac{N_c(z)}{D(z)} x_{c0} + \frac{N_u(z) n_q(z)}{D(z) d_q(z)} x_{p0q} \tag{8}$$

-continued $$= \frac{[N_{p1}(z) \cdots N_{p(q-1)}(z) N_{p(q+1)}(z) \cdots N_{pm}(z)]}{D(z)} \begin{bmatrix} x_{p01} \\ \vdots \\ x_{p0(q-1)} \\ \vdots \\ x_{p0m} \end{bmatrix} + \frac{[N_{c1}(z) \cdots N_{cn}(z)]}{D(z)} \begin{bmatrix} x_{c01} \\ \vdots \\ x_{c0n} \end{bmatrix} + \frac{N_{pq}(z) d_q(z) + N_u(z) n_q(z)}{D(z) d_q(z)} x_{p0q}$$

where $N_u(z)$ is a high-order polynomial for z, and the transfer function $N_u(z)/D(z)$ indicates that the additional input $U_{aq}(Z)$ acts on the feedback loop in such a way as being added to the input signal to the augmented controlled system S.

Concerning the third term in the right of the equation (8), the following possibility can be mentioned. In the equation (6), the transfer function for the initial state value $X_{p0q}$ is $N_{pq}(z)/D(z)$. The use of the additional input $U_{aq}(z)$ as in the equation (7) makes it possible to modify the transfer function of the initial state value $X_{p0q}$ like the third term in the right side of the equation (8).

When the transfer function $n_q(z)/d_q(z)$ for each digital filter as represented by the equation (7) is adequately designed, the initial value response to the initial state value $X_{p0q}$, said initial value response having inherently given an adverse effect to the response Y(z), can be changed into a preferred response as desired so that the response Y(z) can be improved.

A description will next be made about a specific design example of the transfer function $n_q(z)/d_q(z)$ for each digital filter as represented by the equation (7).

Firstly assume that the order m of the augmented controlled system S represented by the equations (1) and (2) is 12(m=12) and the order n of the integral compensator 2 represented by the equations (3) and (4) is 2(n=2).

It is to be noted that the order m of the augmented controlled system S is determined by the torsional vibration modes inherent in the drive shaft of the rotary actuator 1, the velocity observer 4, torsional-vibration stabilizing compensator 5, and the magnitudes of phase lags of the feedback loop.

Now assume that one wants to improve an initial value response caused by the first mode of torsional vibrations. As each vibration mode has two state values consisting of an angular displacement and an angular velocity, the initial state values of angular displacement and angular velocity in the first mode of torsional vibrations are formally set at 1 and 2(q=1, 2), respectively, in the first term of the right hand of the equation (6).

It will hereinafter be assumed that the digital filter 10_a_ in FIG. 1 is a compensator for the initial state value of the angular displacement (q=1) and the digital filter 10_b_ in FIG. 1 is a compensator for the initial state value of the angular velocity (q=2).

For q=1, the transfer function $n_1(z)/d_1(z)$ for the digital filter will firstly be designed as will be described next.

The basic concern is about the arrangement of poles and zeros in the transfer function. As the poles and zeros are both complex numbers in general, they are represented by two-dimensional coordinates on a complex plane.

Figure 9:
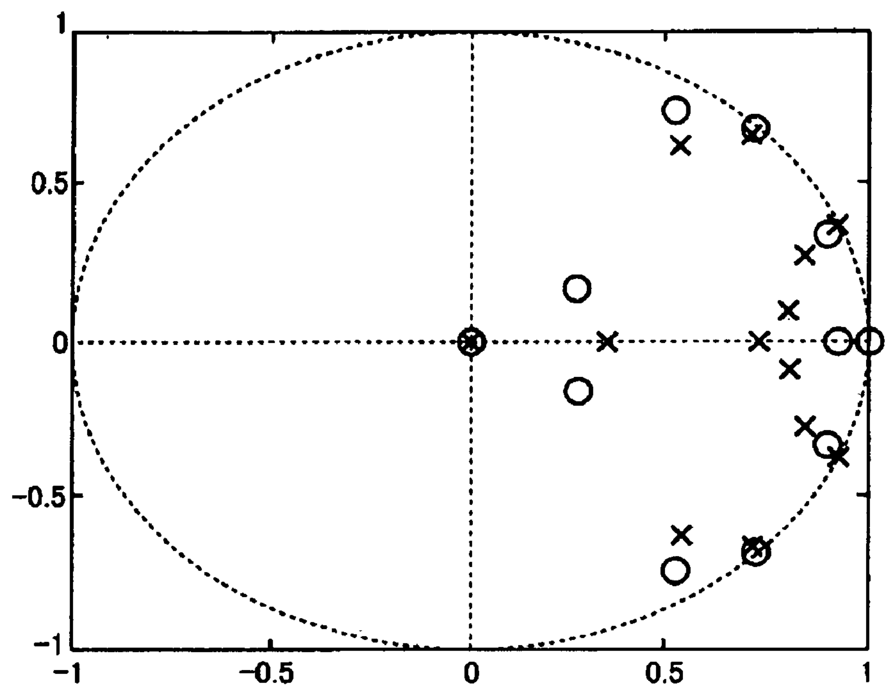
FIG. 9 is a diagram illustrating the arrangement of poles and zero points in a transfer function before additional inputs were added.

FIG. 9 shows an arrangement of poles and zeros for the transfer function $N_{p1}(z)/D(z)$ relating to the initial state value $X_{p01}$ of an angular displacement in the first mode of torsional vibrations in the first term of the right hand of the equation (6).

In the diagram, the abscissa is a real axis along which real number parts of complex numbers are plotted, and the ordinate is an imaginary axis along which imaginary number parts of the complex numbers are plotted. In the diagram, signs x represent the poles while signs ○ represent the zeros. A dashed circle is a unit circle of radius 1 with its center at the coordinate origin.

The poles inherent in the feedback loop exist as many as m+n=12+2=14. By solving the characteristic equation D(z)=0 through numerical calculation, it is understood that these poles are arranged at the signs x in FIG. 9. To keep the feedback loop stable, all the poles exist within the unit circle.

On the other hand, the zeros are roots of the equation $N_{p1}(z)=0$. By solving this equation through numerical calculation, it is understood that these zeros are arranged at the signs ○ in FIG. 9.

A discussion will next be made about poles and zeros in the transfer function relating to the initial state value $X_{p01}$ after the addition of the additional input $U_{aq}(Z)$, that is, the transfer function of the third term in the right of the equation (8).

Since the poles in this transfer function are roots of the equation with the denominator polynomial being set at 0, these poles coincide with the combination of the roots of the above-mentioned characteristic equation D(z)=0 and those of the equation $d_1(z)=0$. This polynomial $d_1(z)$ is the denominator polynomial of the transfer function $n_1(z)/d_1(z)$ for the digital filter which is to be designed in this discussion.

On the other hand, the zeros in the transfer function represented by the third term in the right side of the equation (8) are roots of the equation with the numerator polynomial being set at 0, and the arrangement of the zeros can be determined as desired because this numerator polynomial contains design parameters, that is, the denominator polynomial $d_1(z)$ and the numerator polynomial $n_1(z)$ in the transfer function for the digital filter.

The arrangement of zeros will, therefore, be brought into conformity with the arrangement of the 14 poles shown in FIG. 9.

Further, two additional poles are added such that the initial value response to the initial state value $X_{p01}$ attenuates promptly. Described specifically, the numerator polynomial $n_1(z)$ and the denominator polynomial $d_1(z)$ in the transfer function for the digital filter will be determined such that the poles and zeros will be arranged as described above.

Figure 10:
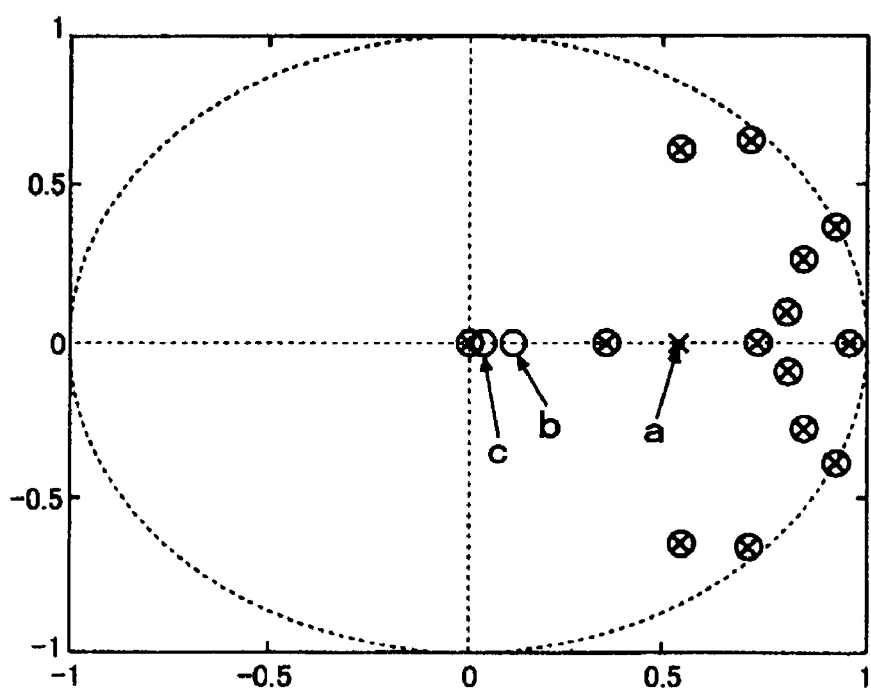
FIG. 10 is a diagram illustrating the arrangement of poles and zero points in the transfer function after additional inputs were added in accordance with the present invention.

As shown in FIG. 10 which illustrates the results of the above-described processing, the newly-arranged 14 zeros overlap the 14 poles contained in FIG. 9. As the poles and the zeros are cancelled out with each other, it is possible to suppress the influence of these 14 poles to the initial value response.

It is to be noted that in FIG. 10, the pole on the real axis as indicated by a is the pole added to achieve the prompt attenuation of the initial value response to the initial state value $X_{p01}$ (note: the two pole are arranged one over the other) and the zeros indicated by signs b,c, respectively, are zeros added necessarily as a result of the addition of the two poles.

The transfer function $n_1(z)/d_1(z)$ of the digital filter 10*a*, which compensates the initial state value $X_{p01}$ of the angular displacement in the first mode of torsional vibration, has been designed as described above.

In exactly the same manner, the transfer function $n_2(z)/d_2(z)$ of the digital filter 10*b* is also designed for q=2, namely, for the initial state value $X_{p02}$ of the angular velocity in the first mode of the torsional vibrations.

A description will next be made about a compensation method for an initial value response by using the above-described digital filters.

At an initial time, the initial state values $X_{p01}$ and $X_{p02}$ of an angular displacement and angular velocity in the first mode of torsional vibrations are detected firstly. In general, it is difficult to detect these state values directly by sensors or the like. Initial state values can be estimated through calculation provided that a state equation model of a controlled system, including plural torsional vibration models, is constructed, a state observer is designed based on the state equation model, and the state observer is mounted on a digital control firmware.

These initial state values are applied as impulse inputs to the respective digital filters 10*a*, 10*b* of q=1, 2 as mentioned in the description on the equation (7).

The additional inputs which compensate the initial value responses in the first mode of torsional vibrations are the respective impulse responses of the digital filters 10*a*, 10*b* as added as described above. The sum is added to the output from the integral compensator 2 as illustrated in FIG. 1.

To successively and continuous perform positioning operations responsive to angle command patterns, the state variables inside the respective filters 10*a*, 10*b* are cleared to zero at every initial time. This can make the respective digital filters 10*a*, 10*b* generate normal additional inputs even when the intervals of commands are very short, specifically even when, before the impulse responses of the digital filters 10*a*, 10*b* are allowed to attenuate to 0, they receive next angle command data to reach a new initial time.

A description will next be made of an operation of a laser drilling machine for a printed circuit board, which is equipped with a steerable mirror control system that performs such compensation of initial value responses as described above.

Figure 2:
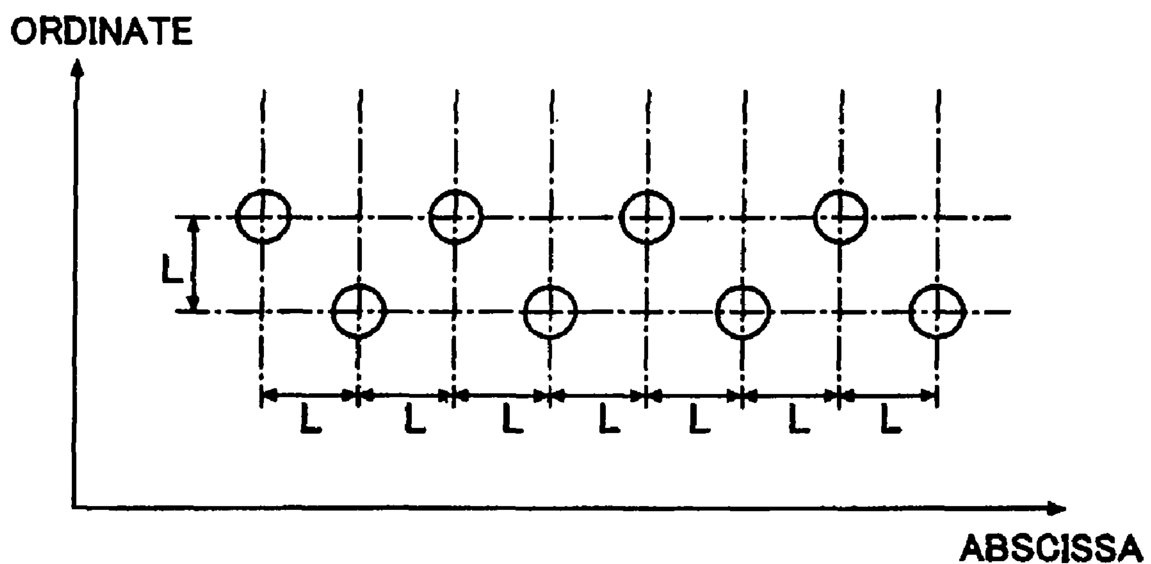
FIG. 2 is a schematic diagram illustrating drilling positions on a printed circuit board.
Figure 3:
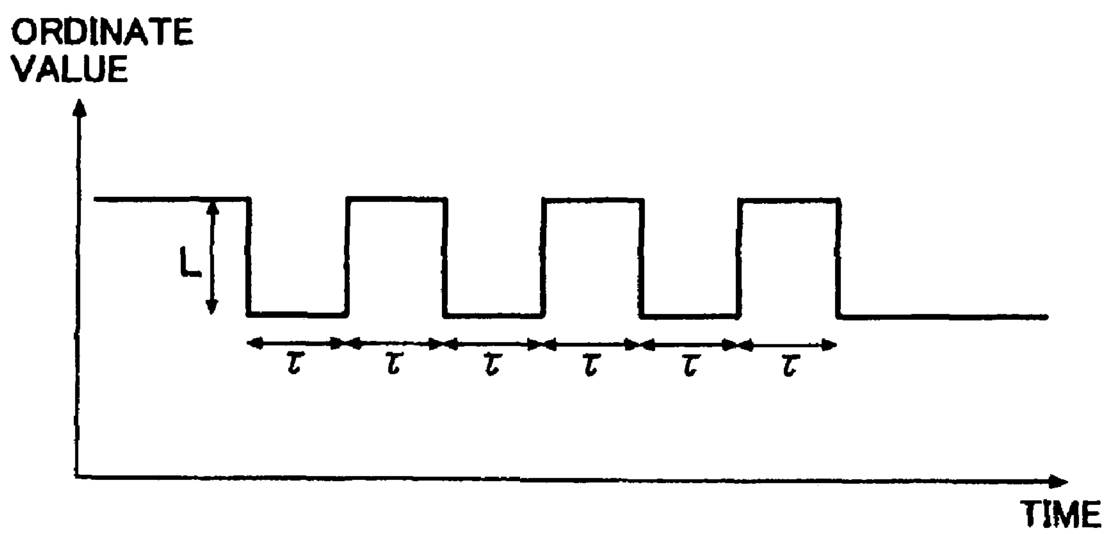
FIG. 3 is a diagram showing one example of an angle command pattern for a steerable mirror.
Figure 4:
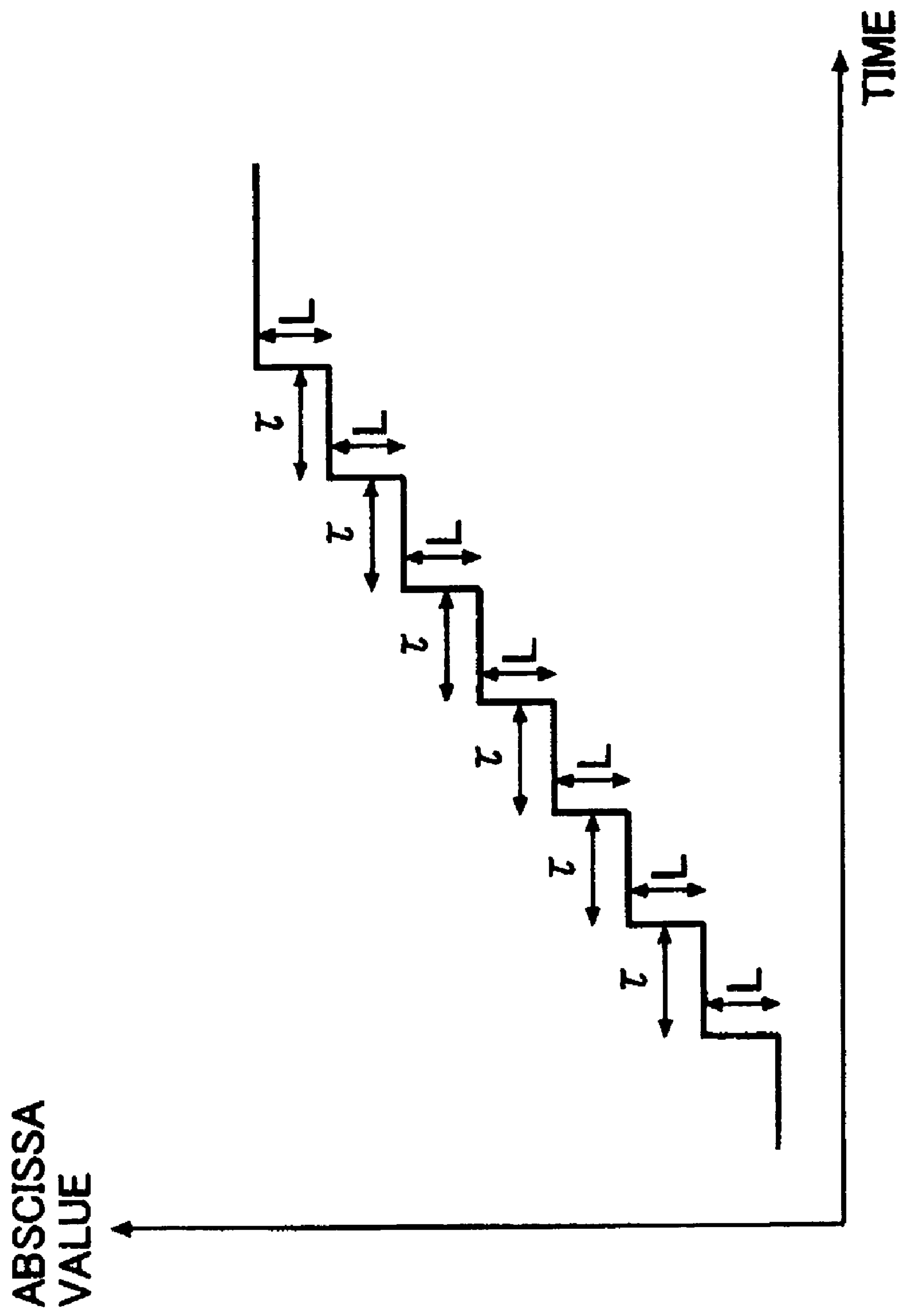
FIG. 4 is a diagram showing another example of the angle command pattern for the steerable mirror.

In FIG. 2, drilling positions on a printed circuit board are indicated by circles ○. FIGS. 3 and 4 illustrate angle command patterns.

On the laser drilling machine according to the present invention, two steerable mirrors are mounted, one being a steerable mirror assigned to perform control in the direction of the ordinate and the other a steerable mirror assigned to perform control in the direction of the abscissa. For each of the steerable mirrors, the steerable mirror control system shown in FIG. 1 is used.

To the steerable mirror control system for the ordinate and the steerable mirror control system for the abscissa, different angle command patterns are transmitted, respectively, from a high-level control unit. Described specifically, the mirror for performing control in the direction of the ordinate reciprocates over angle strokes corresponding to perforation intervals L so that an angle command pattern is given as illustrated in FIG. 3. As the angle strokes are constant, the command intervals are also constant and their value will hereinafter be represented by $\tau$.

The mirror for performing control in the direction of the abscissa, on the other hand, moves unidirectionally over angle strokes corresponding to perforation intervals L so that an angle command pattern is given as illustrated in FIG. 4. The command intervals indicated by $\tau$. For the sake of brevity, the number of perforations to be drilled is set at eight (8) in this description. The angle command patterns of FIGS. 3 and 4 are each in the form of a step-like pattern formed of eight angle command data. However, the number of perforations to be drilled by an actual laser drilling machine is enormous, and further, angle command patterns for the respective axes are each in the form of a step-like pattern which is continuous over a still longer time.

FIG. 5 through FIG. 8 show the response waveforms of tracking error signals corresponding to the angle command pattern shown in FIG. 3, namely, the time waveforms of signals obtained by subtracting the detected angle data 9 from the angle command data 8 in FIG. 1.

Figure 5:
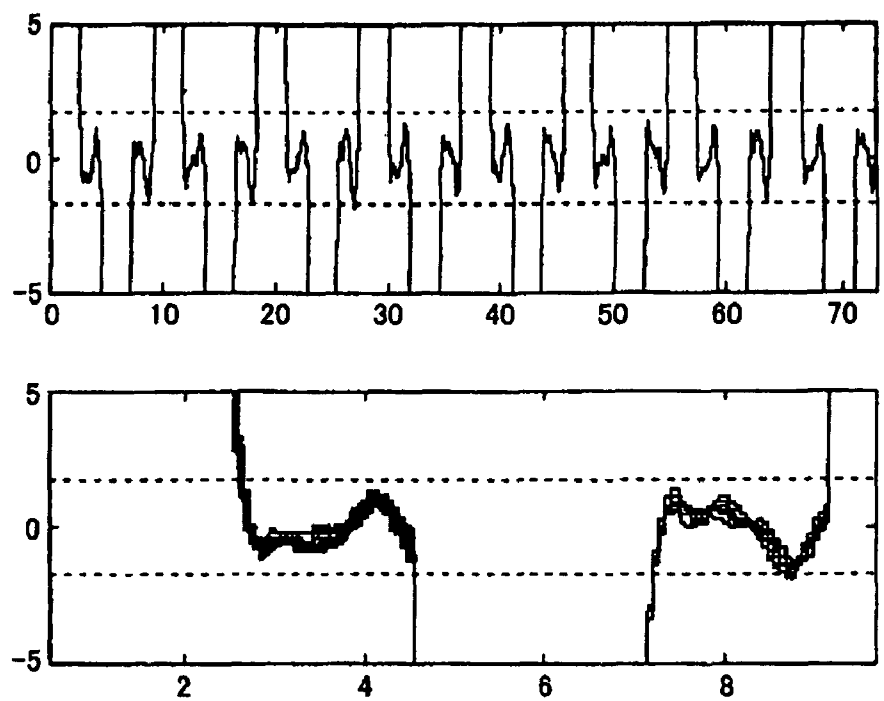
FIG. 5 diagrammatically shows response waveforms of a tracking error signal in the embodiment of the present invention when the command interval ($\tau$) was set at 4.6.

FIG. 5 shows the waveform of a tracking error signal according to the present invention when the command interval was set at 4.6(τ=4.6), and illustrates on an enlarged scale settling responses in the neighborhood of the zero (0) tracking error. The upper diagram successively shows the waveforms of all settling responses in eight reciprocations performed after the mirror started the first reciprocation until the time went on to 75, while the lower diagram illustrates the waveforms of respective settling responses in the forward rotations and return rotations of eight reciprocations as drawn one over another. Described specifically, the lower diagram shows waveforms overdrawn by an oscilloscope when the discontinuous rise edges of the tracking error signals at the initial times of the respective forward rotations were used as triggers.

The two dashed lines in each diagram indicates a tolerance range for settling (hereinafter called "settling tolerance").

As is appreciated readily from the diagrams, the present invention was able to promptly position the steerable mirror within the settling tolerance and to realize good settling responses without any substantial variations.

Figure 6:
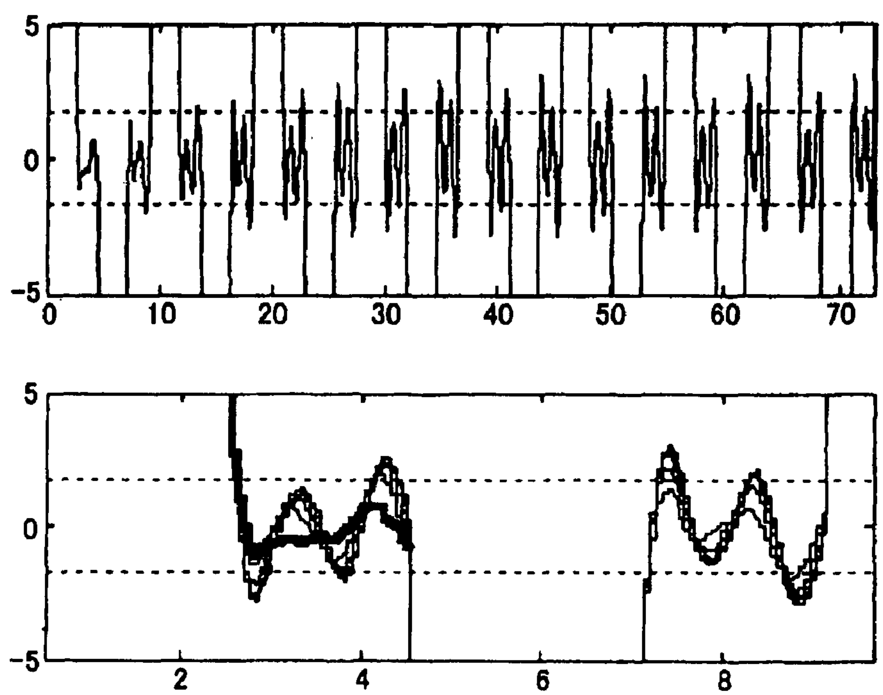
FIG. 6 diagrammatically shows response waveforms of a conventional tracking error signal when the command interval ($\tau$) was set at 4.6.

FIG. 6 diagrammatically illustrates the waveforms of settling responses when as in the case of FIG. 5, the command interval was set at 4.6(τ=4.6) and similar reciprocations were performed with a conventional steerable mirror control system. The upper and lower diagrams should be interpreted in a similar manner as in those of FIG. 5.

As is evident from the diagrams, the steerable mirror controlled by the conventional technique once entered the settling tolerance but the subsequent settling responses were vibrational and fell out of the settling tolerance. Further, the responses in the neighborhood of the zero (0) tracking error varied with time.

Figure 7:
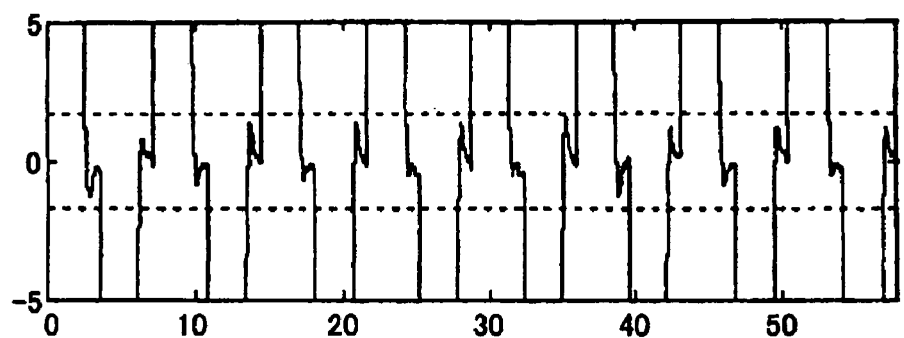
FIG. 7 diagrammatically depicts response waveforms of a tracking error signal in the embodiment of the present invention when the command interval ($\tau$) was set at 3.6.
Figure 7:
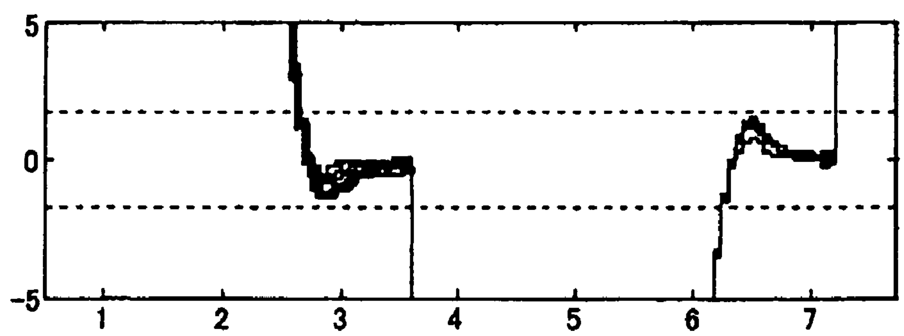

FIG. 7 illustrates the waveform of a tracking error signal according to the present invention when the command interval was set at 3.6 (τ=3.6).

As is readily understood from FIG. 7, the application of the present invention made it possible to promptly position the steerable mirror within the settling tolerance and to realize good settling responses without any substantial variations.

Figure 8:
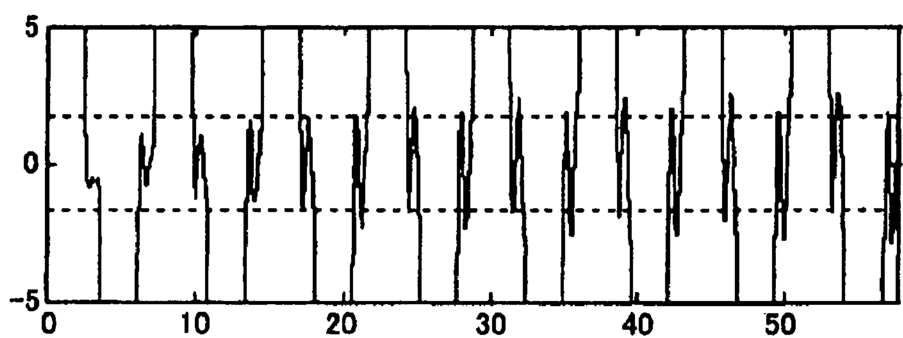
FIG. 8 diagrammatically depicts response waveforms of a conventional tracking error signal when the command interval ($\tau$) was set at 3.6.
Figure 8:
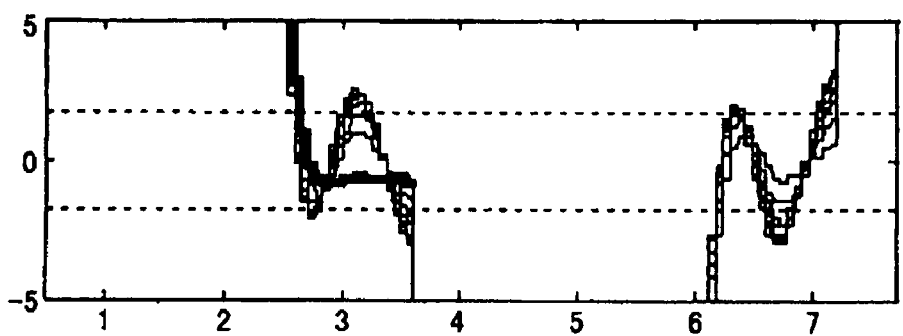

FIG. 8 diagrammatically depicts the waveforms of settling responses when a tracking error signal according to the present invention when as in the case of FIG. 7, the command interval was set at 3.6 (τ=3.6) and similar reciprocations were performed with the conventional steerable mirror control system.

As is evident from FIG. 8, the steerable mirror controlled by the conventional technique once entered the settling tolerance but the subsequent settling responses were vibrational and fell out of the settling tolerance, as in the case of FIG. 6.

As has been described in the above, a steerable mirror can be positioned at a desired position at high speed with high accuracy by performing a compensation on each initial value response with one or more additional inputs in accordance with the present invention.

It is to be noted that the present invention can be applied not only steerable mirrors but also to the servocontrol of a table, which moves with one or more works held in place thereon, in machining apparatus for printed circuit boards.

This application claims the priority of Japanese Patent Application 2004-30736 filed Feb. 6, 2004, which is incorporated herein by reference.

The invention claimed is:

1. A servo control system for a steerable mirror secured on a drive shaft of a rotary actuator, said servo control system being provided with a feedback loop such that said steerable mirror is positioned in an angular position based on position command data, comprising:

an input means for inputting an input signal which is said position command data; and an additional input means for inputting at least one additional input signal, which is other than said position command data, to said feedback loop, wherein said additional input means is designated to add zeros to a transfer function for a q-th initial state value $x_p 0_q$ so as to cancel out poles of said transfer function, which poles are inherent in said feedback loop, in said transfer function for said initial state value $x_p 0_g$ of said feedback loop at a time at which said position command data has been received, wherein said zeros are roots of the equation $N_{pq}(z)d_q(z)+N_u(z)n_q(z)=0$, where $N_{pq}(z)$ is the q-th element of the 1×m high-order polynomial matrix ($1 \leqq q \leqq m$) of the transfer function of said feedback loop, $d_q(z)$ is the denominator of the transfer function of a digital filter for the q-th initial state value $x_{x0q}$, $N_u(z)$ is the numerator of the transfer function for said additional input means, $n_q(z)$ is the numerator of the transfer function of said digital filter for the q-th initial state value $X_{p0q}$, and wherein said poles are roots of the equation $D(z)=0$, where $D(z)$ is the denominator of the transfer function of said feedback loop, which poles are relating to the first-order torsional vibration mode of said drive shaft.

2. A servo control system according to claim 1, wherein said additional input mean comprises at least one digital filter for being inputted with an impulse signal, which is equivalent to said state value at said time at which said position command data has been received, as an input signal; and at said time at which said position command data has been received, a state variable inside said digital filter is cleared to zero.

3. A servo control system according to claim 1, wherein said position command data is a data in a form of a step signal.

* * * * *